(12) United States Patent
Landais et al.

(10) Patent No.: US 12,531,759 B2
(45) Date of Patent: Jan. 20, 2026

(54) BROADCAST SERVICE RESTORATION FOR MULTICAST/BROADCAST SERVICE UPON RADIO ACCESS NODE FAILURE OR RESTART

(71) Applicant: NOKIA TECHNOLOGIES OY, Espoo (FI)

(72) Inventors: Bruno Landais, Pleumeur-Bodou (FR); Horst Thomas Belling, Erding (DE); Philippe Godin, Versailles (FR); David Navrátil, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 394 days.

(21) Appl. No.: 18/107,790

(22) Filed: Feb. 9, 2023

(65) Prior Publication Data

US 2023/0254172 A1    Aug. 10, 2023

Related U.S. Application Data

(60) Provisional application No. 63/308,359, filed on Feb. 9, 2022.

(51) Int. Cl.
*H04W 8/30* (2009.01)
*H04L 12/18* (2006.01)

(52) U.S. Cl.
CPC ........ *H04L 12/1868* (2013.01); *H04L 12/189* (2013.01); *H04W 8/30* (2013.01)

(58) Field of Classification Search
CPC .............................. H04L 12/1868; H02W 8/20
(Continued)

(56) References Cited

U.S. PATENT DOCUMENTS

2020/0053023 A1    2/2020  Haag et al.
2020/0329347 A1   10/2020  Prasad et al.
(Continued)

FOREIGN PATENT DOCUMENTS

CN    112740820 A    4/2021
CN    113711651 A   11/2021
(Continued)

OTHER PUBLICATIONS

Extended European Search Report dated Jun. 21, 2023, corresponding to European Patent Application No. 23155072.4.
(Continued)

*Primary Examiner* — Sibte H Bukhari
(74) *Attorney, Agent, or Firm* — SQUIRE PATTON BOGGS (US) LLP

(57) ABSTRACT

Systems, methods, apparatuses, and computer program products for broadcast service restoration for multicast/broadcast service upon radio access node failure or restart are provided. For example, a method may include storing a last multicast/broadcast service session information received from a multicast/broadcast session management function corresponding to a multicast/broadcast service session. The method may also include detecting that a radio access node associated with the multicast/broadcast service session has restarted or is unreachable. The method may further include taking a further action to adjust the delivery of the multicast/broadcast service session based on the detection.

10 Claims, 5 Drawing Sheets

(58) Field of Classification Search
USPC .......................................................... 370/216
See application file for complete search history.

(56) References Cited

U.S. PATENT DOCUMENTS

| 2021/0076166 A1 | 3/2021 | Navratil et al. |
| 2022/0046729 A1* | 2/2022 | Jeong .................... H04W 76/10 |

FOREIGN PATENT DOCUMENTS

| KR | 20230011314 A * | 1/2023 | ............ H04W 36/02 |
| WO | 2020200489 A1 | 10/2020 | |
| WO | 2021098123 A1 | 5/2021 | |

OTHER PUBLICATIONS

Ericsson: "Discussion on Restoration of an MBS session in 5GS", 3GPP Draft; C4-220165, 3rd Generation Partnership Project (3GPP), Mobile Competence Centre ; 650, Route Des Lucioles ; F-06921 Sophia-Antipolis Cedex ; France vol. CT WG4, no. E-Meeting; Jan. 17, 2022-Jan. 21, 2022; Jan. 7, 2022 (Jan. 7, 2022).

Ericsson [Will Be SA2]: "[Draft] Reply LS on MBS session restoration for NG-RAN failure with or without restart", 3GPP Draft; S2-2200466, 3rd Generation Partnership Project (3GPP), Mobile Competence Centre ; 650, Route Des Lucioles ; F-06921 Sophia-Antipolis Cedex; France vol. SA WG2, no. Elbonia; Feb. 14, 2022-Feb. 25, 2022; Jan. 28, 2022 (Jan. 28, 2022).

CT4: "LS on MBS session restoration for NG-RAN failure with or without restart", 3GPP Draft; S2-2200199, 3rd Generation Partnership Project (3GPP), Mobile Competence Centre ; 650, Route Des Lucioles ; F-06921 Sophia-Antipolis Cedex ; France; vol. SA WG2, no. Electronic meeting; Feb. 14, 2022-Feb. 25, 2022; Jan. 25, 2022 (Jan. 25, 2022).

Nokia et al: "MBS session restoration upon NG-RAN restart", 3GPP Draft; C4-222128, 3rd Generation Partnership Project (3GPP), Mobile Competence Centre ; 650, Route Des Lucioles ; F-06921 Sophia-Antipolis Cedex ; France; vol. CT WG4, no. E-Meeting; Apr. 6, 2022-Apr. 12, 2022; Mar. 29, 2022 (Mar. 29, 2022).

Communication pursuant to Article 94(3) EPC dated Feb. 14, 2025, corresponding to European Patent Application No. 23155072.4.

3GPP TS 23.247 V17.1.0 (Dec. 2021), Technical Specification, 3rd Generation Partnership Project; Technical Specification Group Services and System Aspects; Architectural enhancements for 5G multicast-broadcast services; Stage 2 (Release 17), Dec. 2021.

3GPP TS 23.501 V17.3.0 (Dec. 2021), Technical Specification, 3rd Generation Partnership Project; Technical Specification Group Services and System Aspects; System architecture for the 5G System (5GS); Stage 2 (Release 17), Dec. 2021.

3GPP TS 23.527 V17.2.0 (Dec. 2021), Technical Specification, 3rd Generation Partnership Project; Technical Specification Group Core Network and Terminals; 5G System; Restoration Procedures (Release 17), Dec. 2021.

3GPP TS 29.244 V17.3.0 (Dec. 2021), Technical Specification, 3rd Generation Partnership Project; Technical Specification Group Core Network and Terminals; Interface between the Control Plane and the User Plane Nodes; Stage 3 (Release 17), Dec. 2021.

3GPP TS 29.281 V17.1.0 (Sep. 2021), Technical Specification, 3rd Generation Partnership Project; Technical Specification Group Core Network and Terminals; General Packet Radio System (GPRS) Tunnelling Protocol User Plane (GTPv1-U) (Release 17), Sep. 2021.

3GPP TS 38.413 V16.8.0 (Dec. 2021), Technical Specification, 3rd Generation Partnership Project; Technical Specification Group Radio Access Network; NG-RAN; NG Application Protocol (NGAP) (Release 16), Dec. 2021.

Ericsson, "Discussion on Restoration of an MBS session in 5GS," C4-220165, 3GPP TSG-CT WG4 Meeting #107-bis-e, E-Meeting, Jan. 17-21, 2022.

Notification of the First Office Action dated May 31, 2025, in corresponding Chinese Patent Application No. 202310090125.7, with English translation thereof.

* cited by examiner

BROADCAST SERVICE RESTORATION FOR MULTICAST/BROADCAST SERVICE UPON RADIO ACCESS NODE FAILURE OR RESTART

CROSS REFERENCE TO RELATED APPLICATION

This application claims the benefit of U.S. Provisional Application No. 63/308,359, filed Feb. 9, 2022. The entire content of the above-referenced application is hereby incorporated by reference.

FIELD

Some example embodiments may generally relate to communications including mobile or wireless telecommunication systems, such as Long Term Evolution (LTE) or fifth generation (5G) radio access technology or new radio (NR) access technology or 5G beyond, or other communications systems. For example, certain example embodiments may generally relate to systems and/or methods for providing broadcast service restoration for multicast/broadcast service upon radio access node failure or restart.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform storing a last multicast/broadcast service session information received from a multicast/broadcast session management function corresponding to a multicast/broadcast service session. The at least one memory and computer program code can also be configured, with the at least one processor, to cause the apparatus at least to perform detecting that a radio access node associated with the multicast/broadcast service session has restarted or is unreachable. The at least one memory and computer program code can further be configured, with the at least one processor, to cause the apparatus at least to perform taking a further action to adjust the delivery of the multicast/broadcast service session based on the detection.

An embodiment may be directed to an apparatus. The apparatus can include at least one processor and at least one memory comprising computer program code. The at least one memory and computer program code can be configured, with the at least one processor, to cause the apparatus at least to perform receiving a request for data delivery of a multicast/broadcast session to a fully qualified tunneling endpoint identifier of a radio access node comprising an identifier of the radio access node. The at least one memory and computer program code can also be configured, with the at least one processor, to cause the apparatus at least to perform sending a request to the multicast/broadcast user plane function including the fully qualified tunneling endpoint identifier of the radio access node received from the radio access node and requesting the multicast/broadcast user plane function to start s. The at least one memory and computer program code can further be configured, with the at least one processor, to cause the apparatus at least to perform storing the identifier of the radio access node and the context to control the sending towards the fully qualified tunneling endpoint identifier of the radio access node. The at least one memory and computer program code can additionally be configured, with the at least one processor, to cause the apparatus at least to perform receiving a request to redirect data delivery of a multicast/broadcast session to a new fully qualified tunneling endpoint identifier of a radio access node, or to terminate data delivery of a multicast/broadcast session towards a radio access node. The at least one memory and computer program code can also be configured, with the at least one processor, to cause the apparatus at least to perform, when the request is for redirecting data delivery, sending a request to the multicast/broadcast user plane function including a first fully qualified tunneling endpoint identifier of the radio access node corresponding to the one received from the radio access node and requesting the multicast/broadcast user plane function to start sending data of the multicast/broadcast session towards the first fully qualified tunneling endpoint identifier of the radio access node and including a second fully qualified tunneling endpoint identifier of the radio access node that is set to the one which was previously in use for the multicast/broadcast session and requesting the multicast/broadcast user plane function to stop sending data of the multicast/broadcast session towards the second fully qualified tunneling endpoint identifier of the radio access node. The at least one memory and computer program code can further be configured, with the at least one processor, to cause the apparatus at least to perform, when the request is for terminating data delivery, sending a request to the multicast/broadcast user plane function including a fully qualified tunneling endpoint identifier of the radio access node that is set to the one which was previously in use for the multicast/broadcast session and requesting the multicast/broadcast user plane function to stop sending data of the multicast/broadcast session towards the fully qualified tunneling endpoint identifier of the radio access node.

An embodiment may be directed to a method. The method may include storing a last multicast/broadcast service session information received from a multicast/broadcast session management function corresponding to a multicast/broadcast service session. The method may also include detecting that a radio access node associated with the multicast/broadcast service session has restarted or is unreachable. The method may further include taking a further action to adjust the delivery of the multicast/broadcast service session based on the detection.

An embodiment may be directed to a method. The method can may include receiving a request for data delivery of a multicast/broadcast session to a fully qualified tunneling endpoint identifier of a radio access node comprising an identifier of the radio access node. The method may also include sending a request to the multicast/broadcast user plane function including the fully qualified tunneling endpoint identifier of the radio access node received from the radio access node and requesting the multicast/broadcast user plane function to start s. The method may further include storing the identifier of the radio access node and the context to control the sending towards the fully qualified tunneling endpoint identifier of the radio access node. The method may additionally include receiving a request to redirect data delivery of a multicast/broadcast session to a new fully qualified tunneling endpoint identifier of a radio access node, or to terminate data delivery of a multicast/broadcast session towards a radio access node. The method may also include, when the request is for redirecting data delivery, sending a request to the multicast/broadcast user plane function including a first fully qualified tunneling endpoint identifier of the radio access node corresponding to the one received from the radio access node and requesting the multicast/broadcast user plane function to start sending data of the multicast/broadcast session towards the first fully qualified tunneling endpoint identifier of the radio access node and including a second fully qualified tunneling endpoint identifier of the radio access node that is set to the one which was previously in use for the multicast/broadcast session and requesting the multicast/broadcast user plane function to stop sending data of the multicast/broadcast session towards the second fully qualified tunneling endpoint identifier of the radio access node. The method may further include, when the request is for terminating data delivery, sending a request to the multicast/broadcast user plane function including a fully qualified tunneling endpoint identifier of the radio access node that is set to the one which was previously in use for the multicast/broadcast session and requesting the multicast/broadcast user plane function to stop sending data of the multicast/broadcast session towards the fully qualified tunneling endpoint identifier of the radio access node.

An embodiment may be directed to an apparatus. The apparatus may include means for storing a last multicast/broadcast service session information received from a multicast/broadcast session management function corresponding to a multicast/broadcast service session. The apparatus may also include means for detecting that a radio access node associated with the multicast/broadcast service session has restarted or is unreachable. The apparatus may further include means for taking a further action to adjust the delivery of the multicast/broadcast service session based on the detection.

An apparatus may be directed to an apparatus. The apparatus may include means for receiving a request for data delivery of a multicast/broadcast session to a fully qualified tunneling endpoint identifier of a radio access node comprising an identifier of the radio access node. The apparatus may also include means for sending a request to the multicast/broadcast user plane function including the fully qualified tunneling endpoint identifier of the radio access node received from the radio access node and requesting the multicast/broadcast user plane function to start s. The apparatus may further include means for storing the identifier of the radio access node and the context to control the sending towards the fully qualified tunneling endpoint identifier of the radio access node. The apparatus may additionally include means for receiving a request to redirect data delivery of a multicast/broadcast session to a new fully qualified tunneling endpoint identifier of a radio access node, or to terminate data delivery of a multicast/broadcast session towards a radio access node. The apparatus may also include means for, when the request is for redirecting data delivery, sending a request to the multicast/broadcast user plane function including a first fully qualified tunneling endpoint identifier of the radio access node corresponding to the one received from the radio access node and requesting the multicast/broadcast user plane function to start sending data of the multicast/broadcast session towards the first fully qualified tunneling endpoint identifier of the radio access node and including a second fully qualified tunneling endpoint identifier of the radio access node that is set to the one which was previously in use for the multicast/broadcast session and requesting the multicast/broadcast user plane function to stop sending data of the multicast/broadcast session towards the second fully qualified tunneling endpoint identifier of the radio access node. The apparatus may further include means for, when the request is for terminating data delivery, sending a request to the multicast/broadcast user plane function including a fully qualified tunneling endpoint identifier of the radio access node that is set to the one which was previously in use for the multicast/broadcast session and requesting the multicast/broadcast user plane function to stop sending data of the multicast/broadcast session towards the fully qualified tunneling endpoint identifier of the radio access node.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing broadcast service restoration for multicast/broadcast service (MBS) upon radio access node failure or restart, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Figure 1:
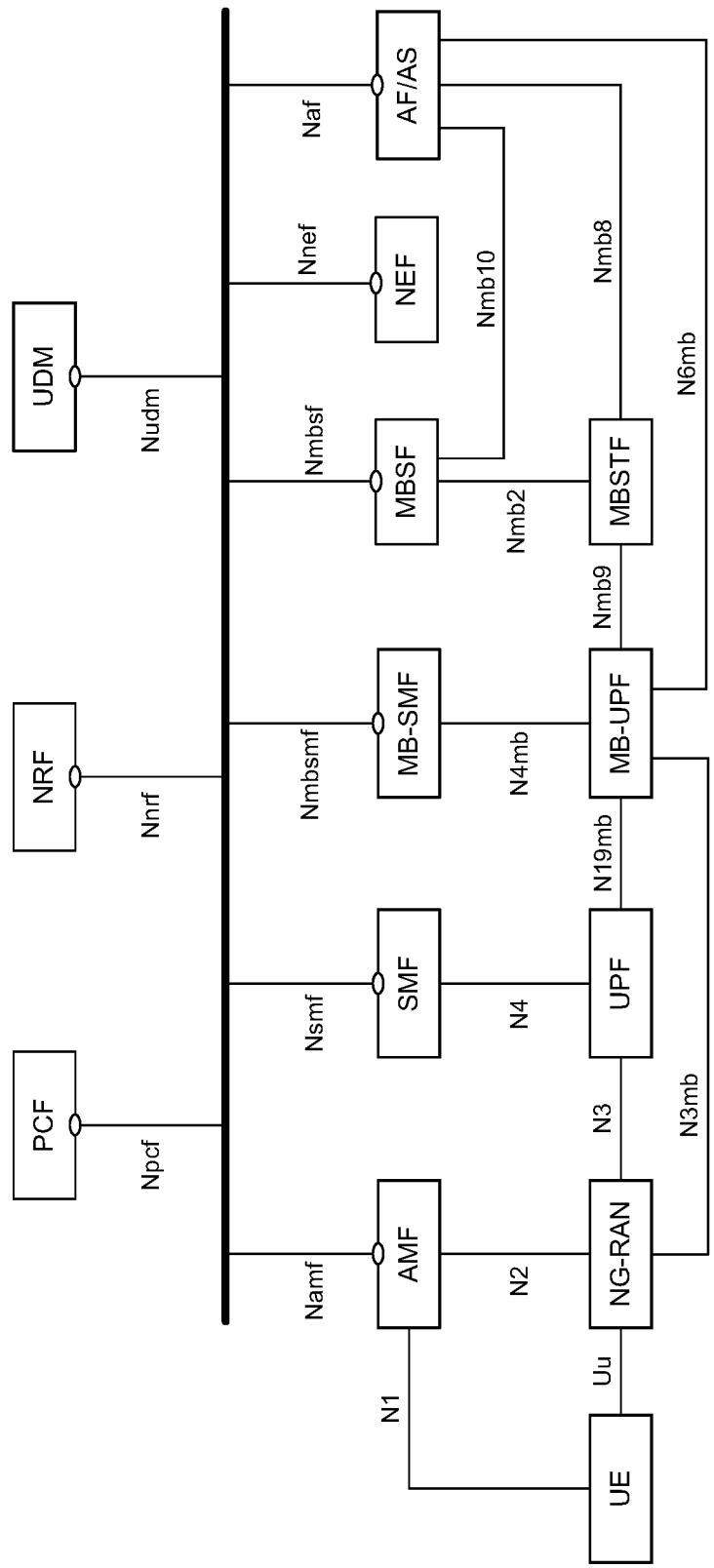
FIG. 1 illustrates a system architecture.

Release 17 (Rel-17) of the Third Generation Partnership Project (3GPP), describes architectural enhancements for fifth generation (5G) multicast and broadcast services. For example, 3GPP technical specification (TS) 23.247 describes a system architecture. FIG. 1 illustrates an example of the system architecture. FIG. 1 is based on FIG. 5.1-1, "5G System architecture for Multicast and Broadcast Service," in 3GPP TS 23.247.

As shown in FIG. 1, N4mb and N4 can serve as the reference points used respectively between the between the session management function (SMF) and the user plane function (UPF) and between the multicast/broadcast (MB) SMF (MB-SMF) and the MB-UPF. Packet forwarding control protocol (PFCP) can be the protocol used over N4mb and N4. PFCP is specified, for example, in 3GPP TS 29.244.

An MB services (MBS) session may correspond to a broadcast MBS session, in which case the SMF and UPF may not be involved in the delivery of the service. An MBS session may alternatively correspond to a multicast MBS session, in which case the SMF and UPF can be involved in the delivery of MBS data, as explained in more detail in 3GPP TS 23.247.

For both broadcast and multicast MBS sessions, unicast transport or multicast transport can be used on N3mb, which may be applicable to broadcast and multicast MBS sessions, and can also be used on N19mb, which may be applicable to multicast MBS sessions only. Unicast transport can send packets in a general packet radio service (GPRS) tunneling protocol (GTP) user plane (GTP-U) tunnel as described in 3GPP TS 29.281. Packets can be sent to a downlink (DL) fully qualified tunnel endpoint identifier (F-TEID), which may include an internet protocol (IP) address and a tunnel endpoint identifier (TEID). Multicast transport can send packets using a low-layer source-specific multicast (LL SSM) address and common GTP TEID (C-TEID). An LL SSM address can include a multicast address, which can be used as destination address in packets sent, and the LL SSM address can also include a source IP address, which can correspond to an IP address of the MB-UPF. 3GPP TS 29.281 includes further discussion regarding IP multicast distribution of user plane data for MBMS and MBS.

MBS service restoration can refer to end to end procedures to restore an MBS session when a failure with or without restart affects any entity involved in the delivery of the MBS session. The entities that may be affected can include, for example, MB-SMF, SMF, access and mobility management function (AMF), MB-UPF, UPF, and radio access network (RAN). In FIG. 1, the RAN element shown is a next generation (NG) RAN (NG-RAN) connected to a user equipment (UE) over a Uu interface.

The MB-SMF may store identities of AMFs handling a multicast or broadcast session. The AMF may be aware of RAN nodes involved in a multicast or broadcast MBS session and may store their identities.

When a failure with or without restart affects an MB-UPF, without certain embodiments all of the PFCP sessions and contexts created in the MB-UPF for MBS sessions may be lost. Moreover, without certain embodiments MBS data may be undeliverable to the end users.

Moreover, without certain embodiments, if an NG-RAN node is reconfigured with a new tracking area identity (TAI) that is part of an MBS service area of an existing MBS session, there may be no way to start the broadcast of an existing broadcast MBS session in the RAN node.

In certain embodiments, an AMF can manage broadcast MBS session restoration on its own for a restarted RAN node.

Figure 2:
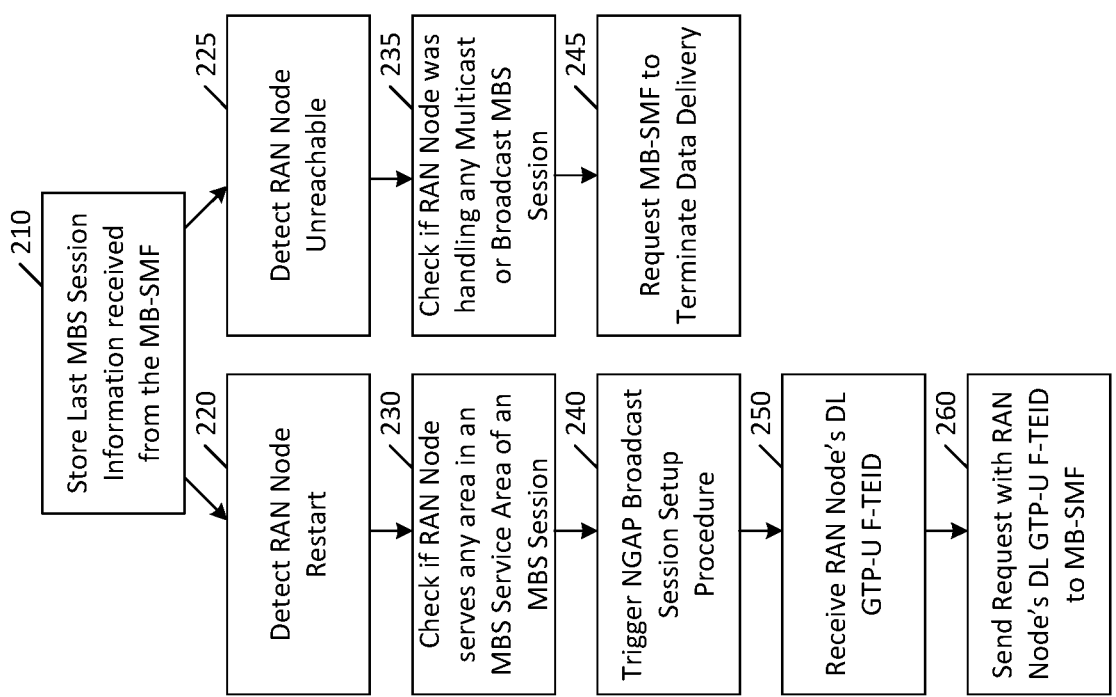
FIG. 2 illustrates a method according to certain embodiments.

FIG. 2 illustrates an example method according to certain embodiments. As shown in FIG. 2, at 210, the AMF can store the last N2 MBS session management container received from the MB-SMF during the establishment of the broadcast MBS session or during a broadcast MBS session update. In this approach, the method may rely on the N2 MBS Session Management container always containing all the relevant information, such as quality of service (QoS) flow information, transport layer addresses, and the like.

At 220, the AMF may detect that the RAN node restart (using existing NG procedures) and, at 230, the AMF can check if the RAN node serves any area, for example TAI or cell, in one of the MBS service areas of an existing MBS session. If so, at 240 the AMF can trigger a next generation application protocol (NGAP) broadcast session setup procedure to re-establish the MBS session in the RAN node. The AMF can include the relevant area session ID in case of location dependent content and can include the associated stored N2 container.

At 225, the AMF may detect that a RAN node is no longer reachable. Such detection may use any desired NG procedure. Upon such detection at 225, at 235 the may AMF check if the RAN node was handling any multicast or broadcast MBS session. If so, at 245, the AMF can request the MB-SMF to discontinue or otherwise terminate delivery of data related to that MBS session towards the RAN node. If unicast transport is used over N3mb, the MB-SMF can configure the MB-UPF to terminate delivery of the data for this MBS session towards the GTP endpoint and IP address of that RAN node (not shown in FIG. 2).

Additionally, if unicast transport is used over N3mb, the RAN node can, at 250, return the RAN node's DL GTP-U F-TEID, for example IP address and tunnel endpoint identifier, in a response to the AMF. The AMF can, at 260, initiate an MBSBroadcast context status notify request towards the MB-SMF including the DL GTP-U F-TEID. Although not shown in FIG. 2, the MB-SMF can modify the PFCP session of the MBS session in the MB-UPF to start distributing MBS data towards this DL GTP-U F-TEID, and to stop doing so towards the earlier DL GTP-U F-TEID that was used before the RAN node restart.

To enable the MB-SMF to modify or terminate the delivery of MBS data towards a RAN node, the RAN node can (not shown in FIG. 2) transmit the RAN node ID via the AMF together with the DL GTP-U F-TEID to the MB-SMF, and the MB-SMF can store that information. This transmission can occur during the establishment of the broadcast session as well as in MBS Broadcast Context Status Notify requests. For multicast, this transmission can occur when a RAN node requests the establishment of shared delivery toward the RAN node itself.

FIG. 2 is provided as one example embodiment of a method or process. However, certain embodiments are not limited to this example, and further examples are possible as discussed elsewhere herein. The method of FIG. 2 may be performed by an access and mobility management function.

Figure 3:
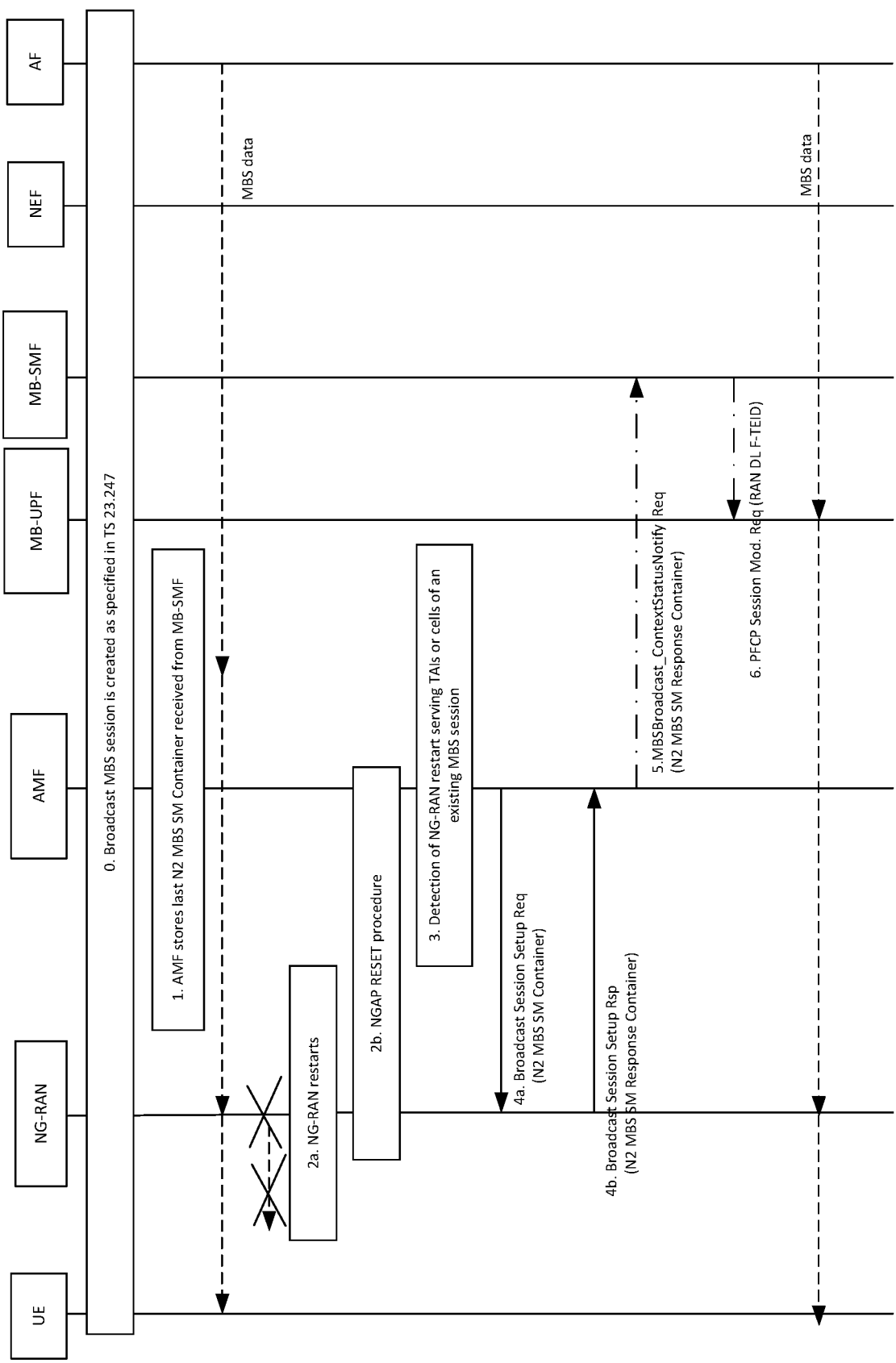
FIG. 3 illustrates a signal flow diagram of restoration of a broadcast multicast/broadcast service (MBS) session upon radio access node failure with restart, according to certain embodiments.

FIG. 3 illustrates an example signal flow diagram of restoration of a broadcast multicast/broadcast service (MBS) session upon radio access node failure with restart, according to certain embodiments.

As shown in FIG. 3, at 0, a broadcast MBS session can be created as described in 3GPP TS 23.247. Then, at 1, the AMF can store the last N2 MBS session management container received from the MB-SMF for the MBS session during the establishment or a subsequent update of the broadcast MBS session. For a location dependent MBS session, the AMF can store the last N2 MBS session management container received from the MB-SMF for the MBS session and MBS service area.

MBS data can flow from an application function (AF) to a UE in the source of the MBS session.

At 2a, the NG-RAN node restarts, which can cause a broadcast MBS service interruption. The AMF can, at 3, detect the NG-RAN node restart, for example via an NGAP reset procedure at 2b.

At 3, the AMF can detect that the RAN has restarted and that the RAN serves at least one TAI or one cell that is part of the MBS service area of an existing MBS session, or one of the MBS services areas of the MBS session in case of location dependent content.

The AMF can re-establish the broadcast MBS session in the RAN node by, at 4a, sending an NGAP broadcast session setup request including the N2 (NGAP) MBS session information setup request transfer information element (IE) containing the last N2 MBS Session Management container that was stored. For example, the last N2 MBS Session Management container can include an N2 (NGAP) MBS session information setup request transfer or MBS Session information modify request transfer.

The NG-RAN node can establish the broadcast MBS session and can return a response to the AMF at 4b. If unicast transport is used over N3mb, the RAN response can include the new DL F-TEID assigned by the RAN node to receive the MBS data from the MB-UPF within the N2 (NGAP) MBS session information response transfer IE container of the NGAP broadcast session setup response message.

At 5, the AMF can send a broadcast context status notify request to the MB-SMF, including the N2 (NGAP) MBS session information response transfer IE container, which may contain the RAN node DL GTP-U F-TEID allocated by NG-RAN node at 4.

At 6, the MB-SMF can modify the PFCP session of the MBS session in the MB-UPF to start distributing MBS data towards this DL GTP-U F-TEID, and to stop doing so towards the earlier DL GTP-U F-TEID that was used before the RAN node restart.

Thus, the MBS service may be restored from the AF to the UE. If multicast transport is used over N3mb, no signaling may be required from the AMF towards the MB-SMF. Nevertheless, such features are shown in FIG. 3 so that FIG. 3 can illustrate multiple options, without requiring every feature illustrated in each option.

Figure 4:
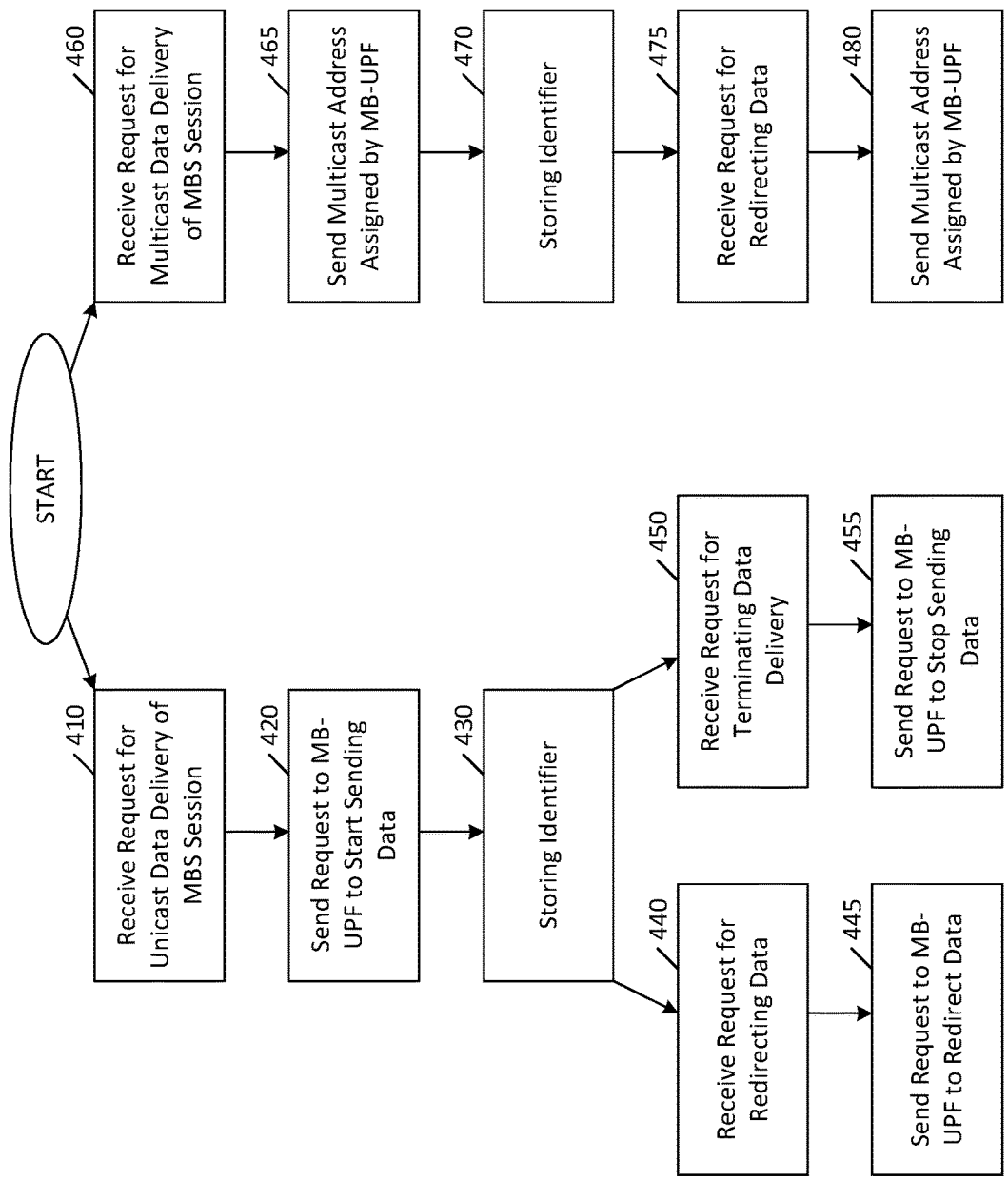
FIG. 4 illustrates a method according to certain embodiments.

FIG. 4 illustrates a method according to certain embodiments. As shown in FIG. 4, a method can include, at 410, receiving a request for data delivery of a multicast/broadcast session to a fully qualified tunneling endpoint identifier of a radio access node comprising an identifier of the radio access node. The method can also include, at 420, sending a request to the multicast/broadcast user plane function including the fully qualified tunneling endpoint identifier of the radio access node received from the radio access node and requesting the multicast/broadcast user plane function to start sending data of the multicast/broadcast session towards the fully qualified tunneling endpoint identifier of the radio access node.

The method can further include, at 430, storing the identifier of the radio access node and the context to control the sending towards the fully qualified tunneling endpoint identifier of the radio access node. The method can additionally include, at 440, receiving a request to redirect data delivery of a multicast/broadcast session to a new fully qualified tunneling endpoint identifier of a radio access node, or, at 450, to terminate data delivery of a multicast/broadcast session towards a radio access node;

When the request is for redirecting data delivery, the method can include, at 445, sending a request to the multicast/broadcast user plane function including a first fully qualified tunneling endpoint identifier of the radio access node corresponding to the one received from the radio access node and requesting the multicast/broadcast user plane function to start sending data of the multicast/broadcast session towards the first fully qualified tunneling endpoint identifier of the radio access node and including a second fully qualified tunneling endpoint identifier of the radio access node that is set to the one which was previously in use for the multicast/broadcast session and requesting the multicast/broadcast user plane function to stop sending data of the multicast/broadcast session towards the second fully qualified tunneling endpoint identifier of the radio access node; and When the request is for terminating data delivery, the method can include, at 455, sending a request to the multicast/broadcast user plane function including a fully qualified tunneling endpoint identifier of the radio access node that is set to the one which was previously in use for the multicast/broadcast session and requesting the multicast/broadcast user plane function to stop sending data of the multicast/broadcast session towards the fully qualified tunneling endpoint identifier of the radio access node.

The fully qualified tunneling endpoint identifier can correspond to the internet protocol address and tunnel endpoint identifier of the user plane tunnel where the radio access node expects to receive data of the multicast/broadcast session.

The method can also include, at 460, receiving a request for data delivery of a multicast/broadcast session using multicast transport towards a radio access node comprising an identifier of the radio access node. The branch from the start to 460 is shown separately from the branch from the start to 410, as these processes may be performed independently at different times or in parallel to one another.

The method can further include, at 465, sending in response to the request for multicast data delivery a source specific multicast address and fully qualified tunneling endpoint identifier assigned by the multicast/broadcast user plane function to the multicast/broadcast session.

The method can further include, at 470, storing the identifier of the radio access node and storing an indication that multicast transport is used toward the radio access node.

The method can also include, at 475, receiving a request to redirect data delivery of a multicast/broadcast session to a new fully qualified tunneling endpoint identifier of a radio access or to terminate data delivery of a multicast/broadcast session towards a radio access node.

The method can further include, at 480, sending in response to the request to redirect the multicast data delivery the source specific multicast address and fully qualified tunneling endpoint identifier assigned by the multicast/broadcast user plane function to the multicast/broadcast session.

FIG. 4 is provided as one example embodiment of a method or process. However, certain embodiments are not limited to this example, and further examples are possible as discussed elsewhere herein. The method of FIG. 4 may performed by a multicast/broadcast session management function.

Figure 5:
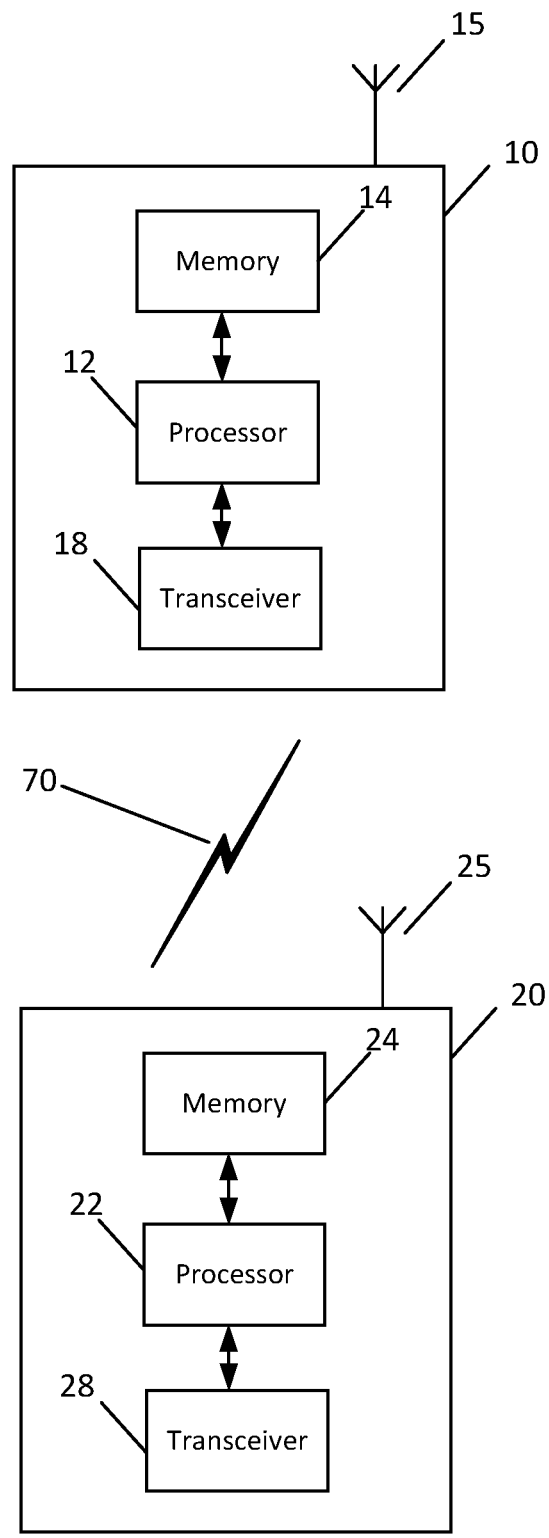
FIG. 5 illustrates an example block diagram of a system, according to an embodiment.

FIG. 5 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 5.

As illustrated in the example of FIG. 5, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 5, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RANI), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/ means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 2-4, or any other method described herein. In some embodiments, as discussed herein, apparatus 10 may be configured to perform a procedure relating to providing broadcast service restoration for multicast/broadcast service upon radio access node failure or restart, for example.

FIG. 5 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5.

As illustrated in the example of FIG. 5, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RANI), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 2-4, or any other method described herein. For example, in an embodiment, apparatus 20 may be controlled to perform a process relating to providing broadcast service restoration for multicast/broadcast service upon radio access node failure or restart, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, in certain embodiments the NG-RAN node restart may be completely hidden to the MB-SMF when multicast transport is used over N3mb. Also, for example, in certain embodiments the AMF can handle the restart of NG-RANs locally, without involving the MB-SMF, other than notifying a change of DL F-TEID address when unicast transport is used over N3mb. Moreover, certain embodiments may also allow starting the broadcast of an existing broadcast MBS session in an NG-RAN node that is reconfigured with a new TAI that is part of an MBS service area of an existing MBS session.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

| PARTIAL GLOSSARY: | |
|---|---|
| AC | Access |
| AGC | Automatic Gain Control |
| CSI-RS | Channel State Information Reference Signal |
| DL | Downlink |
| DMRS | Demodulation Reference Signal |
| gNB | Next Generation Node-B |
| MPE | Maximum Permissible Exposure |
| NR | 5G New Radio |
| PA | Power Amplifier |
| PDCCH | Physical Downlink Control Channel |
| PDCP | Packet Data Convergence Protocol |
| PDSCH | Physical Downlink Shared Channel |
| RA | Random Access |
| RACH | Random Access Channel |
| RO | Random Access Occasion |
| RRC | Radio Resource Control |
| RSRP | Reference Signal Received Power |
| SRS | Sounding Reference Signal |
| SSB | Synchronization Signal Block |
| SSBRI | SSB Resource Block Indicators |
| SSS | Secondary Synchronization Signal |
| TDD | Time Division Duplexing |
| UE | User Equipment |
| UL | Uplink |
| WB | Wide Beam |

We claim:

1. An apparatus, comprising:
at least one processor; and
at least one memory comprising computer program instructions of an access and mobility function,
wherein computer program instructions are configured to, when executed by the at least one processor, to cause the apparatus at least to perform operations, the operations comprising:
storing a last multicast/broadcast service session information received from a multicast/broadcast session management function corresponding to a multicast/broadcast service session;
detecting that a radio access node associated with the multicast/broadcast service session has restarted;
triggering a multicast/broadcast session setup procedure with the radio access node to set up the broadcast session in the radio access node; and
receiving a fully qualified tunneling endpoint identifier from the radio access node in response to the triggering, wherein the fully qualified tunneling endpoint identifier corresponds to an internet protocol address and tunnel endpoint identifier of a user plane tunnel where the radio access node expects to receive data of the multicast/broadcast session, when internet protocol unicast transport is used to deliver the data to the radio access node.

2. The apparatus of claim 1, wherein the detecting comprises:
checking whether the radio access node serves any area in a multicast/broadcast service area of the multicast/broadcast service session; and
determining that the radio access node is associated with the multicast/broadcast service if the radio access node serves any area in a multicast/broadcast service area of the multicast/broadcast service session.

3. The apparatus of claim 1, wherein the requesting comprises providing an identifier of the radio access node.

4. The apparatus of claim 1, wherein the multicast/broadcast service session information contains all information required to setup the broadcast/multicast session in a radio access node.

5. The apparatus of claim 1, wherein for a location dependent multicast/broadcast session, the storing, the detecting and the triggering are performed per multicast/broadcast service area associated with an area session identity of the multicast/broadcast session.

6. A method, comprising:
storing, at an access and mobility function (AMF) of a communication network, a last multicast/broadcast service session information received from a multicast/broadcast session management function corresponding to a multicast/broadcast service session;
detecting, at the AMF, that a radio access node associated with the multicast/broadcast service session has restarted or is unreachable;
triggering, at the AMF, a broadcast session setup procedure with the radio access node to set up the broadcast session in the radio access node; and
receiving, at the AMF, a fully qualified tunneling endpoint identifier from the radio access node in response to the triggering, wherein the fully qualified tunneling endpoint identifier corresponds to an internet protocol address and tunnel endpoint identifier of a user plane tunnel where the radio access node expects to receive data of the multicast/broadcast session, when internet protocol unicast transport is used to deliver the data to the radio access node.

7. The method of claim 6, wherein the detecting comprises:
- checking, at the AMF, whether the radio access node serves any area in a multicast/broadcast service area of the multicast/broadcast service session; and
- determining, at the AMF, that the radio access node is associated with the multicast/broadcast service if the radio access node serves any area in a multicast/broadcast service area of the multicast/broadcast service session.

8. The method of claim 6, wherein for a location dependent multicast/broadcast session, the storing, the detecting and the triggering are performed per multicast/broadcast service area associated with an area session identity of the multicast/broadcast session.

9. The method of claim 6, wherein the requesting comprises providing an identifier of the radio access node.

10. The method of claim 6, wherein the multicast/broadcast service session information contains all information required to setup the broadcast/multicast session in a radio access node.

* * * * *